United States Patent Office 2,911,382
Patented Nov. 3, 1959

2,911,382

PROCESS OF MAKING EXTRUDED STYRENE POLYMER FOAMS

Raymond A. Barkhuff, Jr., East Longmeadow, and Norbert Platzer, Springfield, Mass., assignors to Monsanto Chemical Company, St. Louis, Mo., a corporation of Delaware No Drawing. Application September 21, 1956
Serial No. 611,385

3 Claims. (Cl. 260—2.5)

The present invention relates to a process for extruding foamable styrene polymer compositions and to the particulate foamable styrene polymer compositions to be employed therein.

Styrene polymer foams constitute a valuable class of materials which are finding increasingly wide application in the fabrication of numerous industrial and consumer articles. A widely used method for fabricating such styrene polymer foams comprises extruding particulate foamable styrene polymer compositions through screw-type extruders. When styrene polymer foams are prepared by such extrusion processes it is difficult to obtain foams in which the cell sizes are uniform and which cells have an average diameter of less than about 0.05 inch. Styrene polymer foams containing cells of this size are brittle and the fragile nature of the extruded products limits their acceptance in the art. While certain additives may be incorporated in the particulate foamable styrene polymer compositions to reduce the cell size of the extruded foams, such additives are relatively inefficient and/or seriously reduce the rate at which such compositions can be extruded.

It is an object of this invention to provide an improved process for extruding particulate foamable styrene polymer compositions.

Another object of this invention is to provide an improved process for extruding particulate foamable styrene polymer compositions in which the cell sizes of the extruded foams are substantially uniform and less than about 0.02 inch in diameter.

Another object of this invention is to provide an improved process for extruding particulate foamable styrene polymer compositions in which the cell sizes of the extruded foams are substantially uniform and less than about 0.02 inch in diameter.

A further object of this invention is to provide particulate foamable styrene polymer compositions which, when extruded, provide foamed articles in which the cell sizes are substantially uniform and less than about 0.02 inch in diameter.

Other objects and advantages of the invention will be apparent from the following detailed description thereof.

It has been discovered that when a small quantity of certain decomposable compounds is incorporated in a particulate foamable styrene polymer composition, the resulting composition can be extruded by conventional techniques to prepare resilient styrene polymer foams in which the cell sizes are substantially uniform and less than about 0.02 inch in diameter. The decomposable compounds employed in the invention are those which decompose and liberate water at temperatures of 50–200° C. The decomposable compound containing particulate foamable styrene polymer compositions can be extruded at very satisfactory rates and do not require modification of presently employed extrusion techniques.

The following examples are set forth to illustrate more clearly the principle and practice of this invention to those skilled in the art. All parts are by weight.

EXAMPLE I

Part A

One part of hydrated sodium citrate (containing 11 mols of water per 2 mols of sodium citrate) is dry-blended with 99 parts of a finely divided (8–20 mesh) foamable styrene homopolymer of approximately 65,000 molecular weight and which has 8 weight percent pentane incorporated therein. The hydrated sodium citrate employed decomposes and loses water at 150° C.

Part B

The physical admixture of particulate foamable styrene polymer particles and hydrated sodium citrate is extruded into a foamed sheet through a conventional screw-type extruder at an extrusion temperature of about 325° F. and a die pressure of about 450 p.s.i. The resulting foam has a density of about 4 lbs. per cubic foot and the cell sizes of the foam are substantially uniform and have an average diameter of about 0.015 inch. The foamed sheet is strong and resilient and can be scored and folded through an angle of 180° without fracture.

In contrast to these results, a corresponding particulate foamable styrene polymer composition which does not contain the hydrated sodium citrate, when extruded under identical conditions, gives a brittle foam having grossly irregular cell sizes, nearly all of which exceeds 0.05 inch in diameter. The resulting foam is brittle and fractures when scored and folded through an angle of 180°.

EXAMPLES II–VI

Example I, Part A, is repeated except that the hydrated sodium citrate is replaced with, respectively, sodium sulfite heptahydrate, trisodium phosphate dodecahydrate, calcium lactate monohydrate, ammonium oxalate monohydrate and sodium ammonium acid phosphate tetrahydrate, all of which decompose at temperatures of between 50° C. and 200° C. In each case a product of comparable properties is obtained which, when extruded, yields a styrene polymer foam of fine pore size.

EXAMPLE VII

A finely divided (8–20 mesh) foamable styrene homopolymer of approximately 60,000 molecular weight and which contains 6 weight percent pentane incorporated therein is blended with an aqueous solution of sodium citrate and then dried in open trays below 60° C. to deposit a hydrated sodium citrate on the surface of the polymer particles. The quantity of sodium citrate employed is sufficient to deposit 1 weight percent of the hydrated sodium citrate on the polymer particles, said calculation being based upon the hydrate containing 11 mols of water per 2 mols per sodium citrate. The coated styrene polymer particles, when extruded under the conditions described in Example I, Part B, yield a styrene polymer foam having an average cell diameter of 0.018 inch.

EXAMPLE VIII

Example VII is repeated except that the sodium citrate is replaced with sodium tetraborate. The quantity of sodium tetraborate employed is sufficient to deposit 1 weight percent of sodium tetraborate pentahydrate on the polymer particles. The product yields a styrene polymer foam having an average cell size of 0.015 inch when extruded under the conditions described in Example I, Part B.

EXAMPLE IX

The foamable styrene homopolymer particles described in Example VII are coated with 0.5 weight percent of sodium acetate trihydrate. The technique of Example VII is employed except that the polymer particles are dried at a temperature of 50° C. The product yields a styrene polymer foam having an average cell diameter of 0.010 inch when extruded under the conditions described in Example I, Part B.

The extrudable particulate foamable styrene polymer compositions provided by this invention comprise (1) a styrene polymer, (2) a foaming agent which is an organic compound having a boiling point below the softening point of the styrene polymer employed and (3) a compound which decomposes at a temperature of 50–200° C. and liberates water.

The decomposable compounds included in the compositions of this invention may be either organic or inorganic in nature and most frequently are hydrated salts which decompose in the indicated temperature range. Scores of suitable hydrated salts in addition to those set forth in the above examples may be found by reference to standard chemical handbooks. In lieu of hydrated salts, it is possible to employ other compounds which decompose at 50–200° C. with the liberation of water. The prime examples of such decomposable compounds are polycarboxylic acids such as maleic acid. The decomposable compounds are included in the compositions of this invention in only small amounts, usually in the range of 0.1–5.0 weight percent and preferably 0.2–2.0 weight percent of total composition.

The decomposable compound containing foamable styrene polymer compositions can be prepared by simply admixing the decomposable compound with a particulate foamable styrene polymer composition. When the decomposable compound employed is a hydrated salt, the compositions of the invention can be prepared by coating the particulate foamable styrene polymer composition with an aqueous solution of a salt capable of forming a hydrate on drying. This latter technique is preferred, since the hydrated salt is formed in situ on the surfaces of the polymer particles and clings tenaciously thereto.

The styrene polymers included in the compositions of this invention are homopolymers of styrene and interpolymers of styrene containing a predominant proportion of styrene, i.e., greater than 50 weight percent and preferably greater than 75 weight percent styrene. Examples of monomers that may be interpolymerized with the styrene included the conjugated 1,3-dienes, e.g., butadiene, isoprene, etc., alpha,beta-unsaturated monocarboxylic acids and derivatives thereof, e.g., acrylic acid, methyl acrylate, ethyl acrylate, butyl acrylate, 2-ethylhexyl acrylate and the corresponding esters of methacrylic acid, acrylamide, methacrylamide, acrylonitrile, methacrylonitrile, divinyl benzene, etc. If desired, blends of the styrene polymers with other polymers may be employed, e.g., blends of the styrene polymer with rubbery diene polymers, or the analogous compositions obtained by dissolving a rubbery diene polymer in the styrene monomer and subsequently polymerizing the mixture. In any of the above type resins, all or a portion of the styrene may be replaced with its closely related homologues such as alpha methylstyrene, o-, m-, and p-methylstyrenes, o-, m-, and p-ethylstyrenes, 2,4-dimethylstyrenes, etc. In general, the styrene polymers employed should have a molecular weight in the range about 40,000–80,000 (as determined by the Staudinger method).

The foaming agent included in the compositions of the invention may be any organic compound which boils below the softening point of the styrene polymer and which can be incorporated substantially homogeneously therethrough. Preferably, although not mandatorily, the foaming agent should have little or no solvent action on the styrene polymer. Suitable examples of such foaming agents include acetone, methyl alcohol, methyl acetate, ethyl acetate, methyl formate, ethyl formate, dichloroethylene, isopropyl chloride, propionaldehyde, and dipropyl ether. Other examples of suitable foaming agents include methyl chloride, dichloroethane, dichlorodifluoromethane, and other low-boiling chlorofluoroalkanes. An especially preferred class of foaming agents consists of aliphatic hydrocarbons boiling within the range of about 10° C. to about 80° C., e.g., pentane, hexane, heptane, cyclopentane, cyclopentadiene and petroleum ethers boiling within the indicated temperature range. If desired, mixtures of two or more foaming agents may be employed.

The extrusion process provided by the present invention is conventional except for the composition employed. For example, the extrusion operation may be carried out in continuous screw extruders at temperatures ranging from about 250° F. to about 400° F., depending upon the softening temperature of the styrene polymer employed. As an additional consideration, the extrusion should be carried out at a temperature above the decomposition temperature of the hydrated salt included in the foamable styrene polymer composition. In general, the most uniform material is obtained at extrusion temperatures of 300–325° F. The material may be extruded through dies of any desired configuration into open or closed molds or into the open air. The pressure of the die should exceed 150 p.s.i. to prevent foaming within the die. The extrusion rates obtainable under any given set of extrusion conditions are substantially equivalent to those obtained with corresponding foamable styrene polymer compositions which do not contain hydrated salts.

The above descriptions and particularly the examples are set forth by way of illustration only. Many other variations and modifications thereof will be apparent to those skilled in the art and can be made without departing from the spirit and scope of the invention herein described.

What is claimed is:

1. A process for preparing a resilient styrene polymer foam having substantially uniform cell sizes, the average diameter of which is less than about 0.02", which comprises extruding a mixture of 98.0–99.8 weight percent of a foamable styrene polymer composition and, correspondingly, 2.0–0.2 weight percent of a hydrated salt at a temperature of 250–400° F. and a pressure of greater than 150 p.s.i., said foamable styrene polymer composition having incorporated therein, as a foaming agent, a liquid aliphatic hydrocarbon containing at least 5 carbon atoms in its structure and having a boiling point not higher than about 80° C.; said hydrated salt decomposing at a temperature of 50–200° C. and liberating water.

2. The process of claim 1 in which the composition that is extruded consists of about 99 weight percent of a foamable styrene polymer composition and about 1 weight percent of a hydrated salt.

3. The process of claim 1 wherein the hydrated salt employed in selected from the group consisting of hydrates of sodium sulfite, trisodium phosphate, calcium lactate, ammonium oxalate, sodium ammonium acid phosphate, sodium citrate and sodium acetate.

References Cited in the file of this patent

UNITED STATES PATENTS 2,744,291    Stastny et al. _____ May 8, 1956
2,797,443    Carlson _____ July 2, 1957